United States Patent Office 3,454,260
Patented July 8, 1969

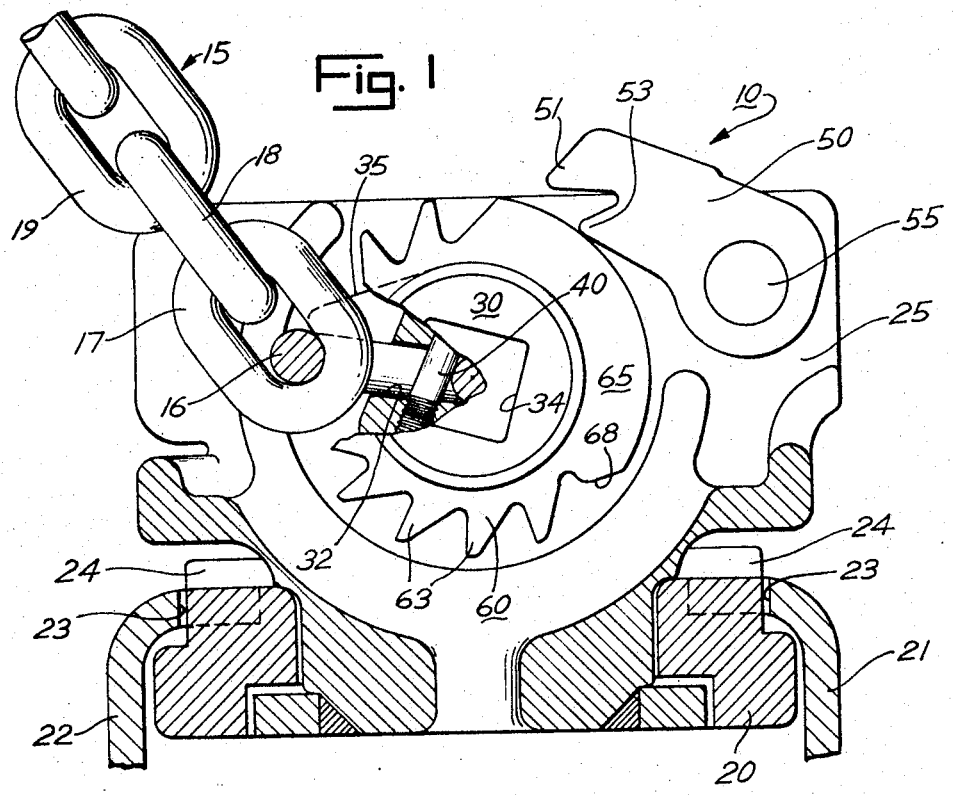
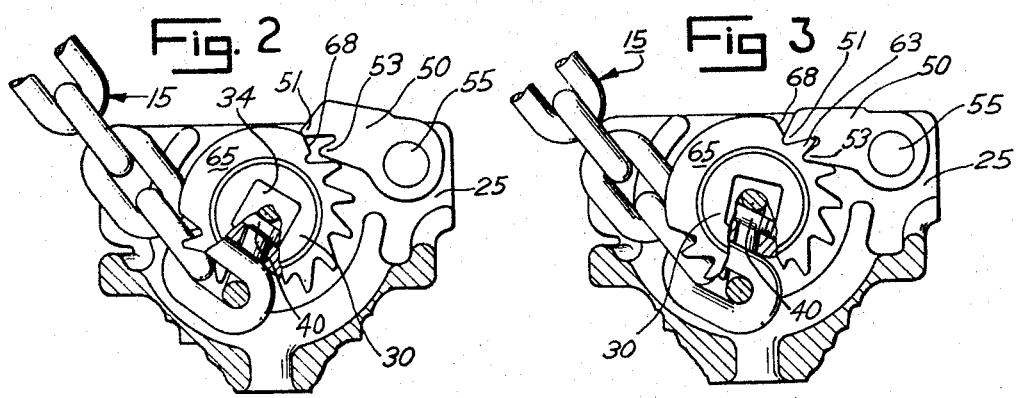

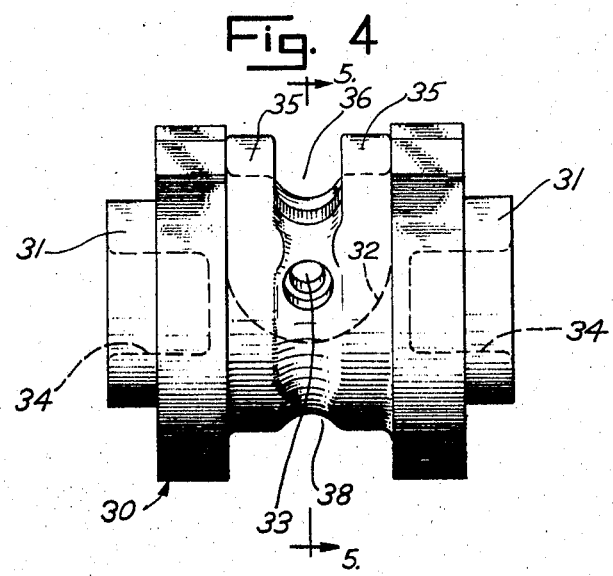
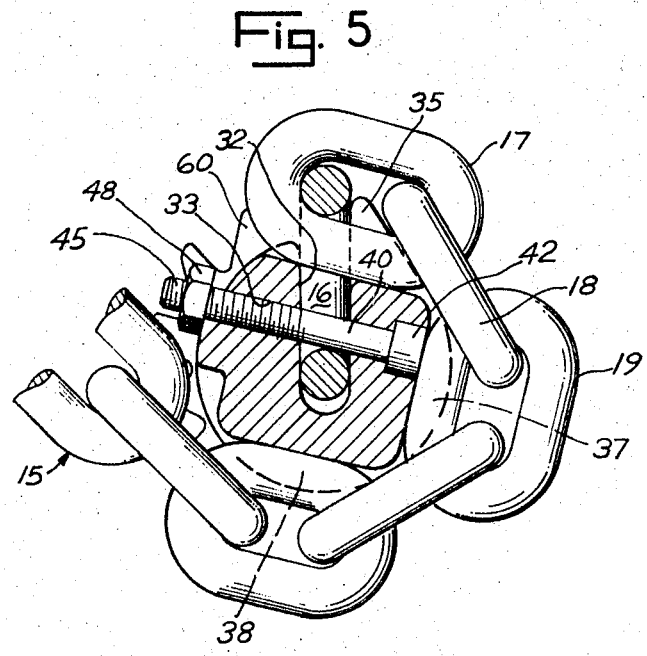

3,454,260
WINCH WITH PROTECTIVE RATCHET
Phillip D. Schwiebert, Glencoe, Ill., and Paul H. Griffith, Narberth, Pa., assignors to MacLean-Fogg Lock Nut Co., Mundelein, Ill., a corporation of Delaware
Filed Sept. 29, 1967, Ser. No. 671,808
Int. Cl. B66d 1/00; A63b 61/04; G05g 1/00
U.S. Cl. 254—186                                    10 Claims

ABSTRACT OF THE DISCLOSURE

A chain winch with a protective ratchet having an extended land segment to prevent locking engagement with the pawl whenever the connection between chain and winch drum is subject to a direct pull. The land segment is of sufficient extent, approximately 120°, to insure at least a partial wrap of chain on the drum to relieve the connection.

Background of the invention

This invention relates generally to winches, and more particularly, to a winch having a protective ratchet therefor.

Desirable winch characteristics of durability, simplicity, and compactness have resulted in the use of relatively small and solid winch drums, shaped to guide chain winding and having a socket type coupling for drive. A drum connection is usually provided by a radial slot in the drum for reception of the chain's end-link, which is secured therein by a pin or bolt. The compact drum size, as well as other considerations, of course, require a correspondingly small size connecting pin or bolt. Thus the chain-drum connection is insufficient to sustain a direct load to chain failure levels. That is, the connecting bolt or pin have to be of small diameter and cannot be designed to be of a strength equivalent to the chain under direct or near direct pull-out conditions. However, in the past it was believed that this would be compensated for by a suffiicient amount of chain wrap on the drum to take the pressure off of the connection. Nevertheless, failures at the connection indicate that the winches in actual use are often utilized with little or no wrap of chain on the drum. Therefore, there is a need to insure a minimal wrap, so that the connection can withstand impact and prevent premature failure.

Summary of the invention

Therefore, to overcome the foregoing or other difficulties of the prior art, the general object of this invention is to provide a winch with a protective ratchet insuring at least a minimum partial wrap and chain on the winding drum. To this end, the present invention has accomplished this by filling in a selected segment of drum teeth to provide an extended land portion which prohibits pawl engagement until a sufficient chain wrap exists to relieve direct pulling force on the connection.

Furthermore, since it is also desirable to utilize a pawl having a plurality of engaging teeth, it is, of course, consistent to prevent a partial engagement by only a single pawl tooth which otherwise could provide another area of premature system failure. For this reason, the present invention teaches a bevel at one end of the land segment which prohibits the engagement of a single pawl tooth therewith.

Thus, one of the objects of this invention is to prevent premature failure in a winch at the chain-drum connection.

It is an object of this invention to insure at least a partial wrap of flexible tie about the winding drum to relieve the drum connection from direct pull.

Another object of this invention is to provide a protective ratchet on a winding winch which has an extended land segment prohibiting pawl engagement until a minimum tie wrap is achieved.

It is still another object to prevent failure by engagement of only a single tooth of a double tooth pawl.

Yet another object is to provide a dependable, durable, compact, simple and foolproof winch with protective ratchet which is economical to produce by utilizing a minimum of conventional, currently available materials and parts which may be easily modified for the purpose of this invention and which lend themselves to standard mass-production manufacturing techniques.

Further and other objects, and a more complete understanding of the invention, may be had by referring to the following description and claims, taken in conjunction with the accompanying drawings:

Description of the drawings

For the purpose of illustrating the invention, there is shown in the drawings the form which is presently preferred, it being understood, however, that this invention is not necessarily limited to the precise arrangements and instrumentalities there shown.

FIG. 1 is a side elevational view, partially in section, of a preferred winch, with the parts shown in positions which afford a direct pull on the chain-drum connection;

FIG. 2 is a reduced partial version of FIG. 1, with the drum turned in a chain-winding direction from the position of FIG. 1, but not yet in position for engagement of the holding pawls;

FIG. 3 is a reduced version of FIG. 1, showing the protective ratchet and pawl engaged and with a sufficient partial wrap of chain on the drum;

FIG. 4 is an enlarged front elevational detail of the winch winding drum and protective ratchets;

FIG. 5 shows chain wrapped around a cross-section taken along lines 5—5 of FIG. 4.

Description of the preferred embodiment

Referring now to the drawings in detail, wherein like numerals indicate like elements, there is shown in FIG. 1 an illustration of a winding winch, the subject of the present invention, designated generally at 10. A flexible tie, such as the chain 15 having an end link 16 and following links 17, 18, 19, is wound for tightening by the winch 10. Naturally, the present invention is understood to be also applicable to types of flexible ties other than chain, such as cable, straps, ropes etc.

Winch 10 includes a base 20 which may be anchored within opposed anchor flanges 21, 22 by sliding therealong to a desired position where flange notches 23 receive the base lugs 24. Base 20 includes a pair of spaced side walls 25 journaled to pivot 360° about a vertical axis. This well known freight lading tie-down system is in present-day common use and is shown only as a typical example, it being understood that other non-pivotal bases, and/or different anchoring systems, may be employed.

A winch drum 30 is journaled for winding between the upright side flanges 25, for example, by integral axle portions 31 extending through accommodating openings (not shown). The winch drum 30 includes a radial slot 32 therein as well as a cross bore 33 therethrough. A socket 34, shown as square, although other shapes are equally satisfactory, is provided in each of the extending axle portions 31 for a coupling reception with a drive implement, such as a ratchet wrench or power tool. A pair of guide lips 35 extend at one side of the slot 32, as shown, to define a groove 36 therebetween, as best visualized with reference to FIG. 4. Guide grooves 37, 38 continue around the periphery of drum 30, in line with the guide groove 36, as shown.

Means for connecting the flexible tie to the drum 30 are provided by a pin or a bolt 40 extending within the cross bore 33, through slot 32 and the end link 16 of chain 15, as illustrated. As shown fully in FIG. 5, bolt 40 may be of the cap screw type having a socket head 42 and threaded end 45 engaged by a nut 48.

A gravity biased pawl arm 50 is pivoted over drum 40 on a shaft 55 which is journaled in between the upright side walls 25. Pawl arm 50 is of the double tooth variety having teeth 51, 53.

A ratchet wheel 60 is integrally formed at both ends of the drum, 30, as shown in FIG. 4. Ratchet 60 includes typical one-way inclined teeth 63 for engagement with the pawl teeth 51, 53 permitting only a take-up winding. However, the ratchet wheel 60 differs significantly in that a segment is toothless, providing an extended land segment 65. The terminating end of land segment 65 has a bevel 68 having the inclination indicated on the drawings. It is to be appreciated that the land segment 65 extends over an appreciable arc of the ratchet wheel 60, approximating 120°.

Operation of the invented winch 10 is typical in that it may be anchored and driven as usual. That is, the base 20 may be slid along the flanges 21, 22 to a desired position where the lugs 24 match flange notches 23 for secure anchoring thereat. Then a driving implement (not shown), such as a ratchet or a power tool may be inserted into coupling socket 34 to wind and take up chain 15. Gravity biased pawl 50 locks the drum 30 at a wound-up position. However, it is to be noted that the land segment 65 prevents a locking engagement with the teeth 51, 53 of pawl 50 whenever there is an insufficient wrap of chain 15 on drum 30. Notice, at FIG. 1, the connecting pin 40 would be subject to the shearing forces of a direct pull by the chain 15. However, at this position the land segment 65 presents a smooth unengaging surface to the pawl 50, thus requiring additional winding before the winch 10 will lock. In FIG. 2, the drum 30 has been rotated until the terminating end of land segment 65 is opposite the pawl arm 50. The bevel at 68 engages the tip of tooth 51 and maintains the disengagement, since there is no ratchet tooth 63 for engagement with the lone tooth, pawl tooth 53. In this manner, a premature failure by engagmeent of a single pawl tooth is also avoided. A further winding is required until, as shown in FIG. 3, both teeth 51, 53 of pawl arm 50 may engage about a ratchet tooth 63. At this position it is to be noted that chain 15 has partially wrapped about drum 30 and relieves the direct pull shear pressure on the connecting pin 40.

Guidance for winding of the chain 15 on drum 30 is provided by the guide lips 35, groove 36 and grooves 37, 38. For example, the cross link 17 is received and guided between the guide lips 35 into groove 36. Also, the following cross links 19, etc., are likewise received and guided by the guide grooves 37, 38, as may be best visualized by reference to FIG. 5. In this manner, the wrapping of chain 15, at least for the initial wrap, about drum 30, is neat and orderly.

Release of the winch is identical to that of conventional winches. The drum 30 may be wound slightly to unbind the pawl arm 50 which can then be lifted upward against its gravitational bias and away from the ratchet 60. The ratchet 60 and drum 30 then are free to rotate in a reverse unwinding direction.

The present invention may be embodied in other specific forms without departing from the spirit of potential attributes thereof.

We claim:
1. A winch for winding a flexible tie, comprising in combination: an anchorable base; a drum journaled on said base for winding; means for connecting said flexible tie to said drum; a pawl pivoted on said base over said drum; and a ratchet wheel affixed to said drum under said pawl, said ratchet wheel having a one-way inclined toothed segment for engagement with said pawl permitting only a take-up winding and including a singular extended land segment having a circumferential span on the ratchet wheel which is equivalent to that of a plurality of teeth on said toothed segment at a position related to the position of said means on said drum to prevent said engagement whenever said means is subject to direct pull from said flexible tie without relief provided by adjacent wrapped contact of said flexible tie on said drum.

2. A winch in accordance with claim 1, wherein said land segment extends along an arc of said wheel opposite said pawl during said direct pull, said arc of sufficient extent to insure at least a partial wrap of said flexible tie.

3. A winch in accordance with claim 2, wherein said arc is approximately 120 degrees and is displaced circumferentially of said ratchet wheel from said means.

4. A winch in accordance with claim 3, wherein said pawl is double toothed, and said land segment terminating in a beveled surface at both ends to prevent a partial engagement therewith by a single pawl tooth.

5. A winch in accordance with claim 4, including a ratchet wheel at each end of said drum, and a pair of pawls for said engagement therewith, each ratchet wheel including said land segment respectively.

6. A winch in accordance with claim 4, wherein said flexible tie is a chain, said drum being radially slotted in a direction parallel to the longitudinal drum axes for reception of an end link of said chain.

7. A winch in accordance with claim 6, wherein said means for connecting is a pin passing through said drum and end link, transversely across said slot.

8. A winch in accordance with claim 7, wherein said pin has a smaller cross-sectional diameter than said end link for conservation of material and strength of said drum.

9. A winch in accordance with claim 8, wherein said drum includes a pair of guide lips extending outward at one side of said slot, said lips defining a groove therebetween for reception of a cross-link adjacent said end link.

10. A winch in accordance with claim 9, wherein said drum includes tangent grooves for guided reception of consecutive cross links following said end and cross link.

References Cited
UNITED STATES PATENTS

| | | | |
|---|---|---|---|
| 1,324,112 | 12/1919 | Giddings | 254—161 |
| 2,895,714 | 7/1959 | Clark | 254—186 |
| 3,293,936 | 12/1966 | Wilson | 254—167 |
| 3,337,927 | 8/1967 | Dresie | 254—161 |

EVON C. BLUNK, *Primary Examiner.*

H. C. HORNSBY, *Assistant Examiner.*

U.S. Cl. X.R.

74—575; 254—161